United States Patent
Schmidhammer

(10) Patent No.: US 9,374,123 B2
(45) Date of Patent: Jun. 21, 2016

(54) DEVICE, MODULE AND CIRCUIT ASSEMBLY FOR WIRELESS COMMUNICATIONS, AND CONFIGURED FOR INTERFERENCE SUPPRESSION VIA USE OF FIRST AND SECOND PHASE SHIFTERS, A BAND STOP FILTER AND/OR A DIVERSITY DUPLEXER CIRCUIT

(75) Inventor: Edgar Schmidhammer, Stein an der Traun (DE)

(73) Assignee: EPCOS AG, München (DE)

( * ) Notice: Subject to any disclaimer, the term of this patent is extended or adjusted under 35 U.S.C. 154(b) by 158 days.

(21) Appl. No.: 14/113,808

(22) PCT Filed: Apr. 17, 2012

(86) PCT No.: PCT/EP2012/057011
§ 371 (c)(1),
(2), (4) Date: Jan. 10, 2014

(87) PCT Pub. No.: WO2012/146512
PCT Pub. Date: Nov. 1, 2012

(65) Prior Publication Data
US 2014/0113574 A1    Apr. 24, 2014

(30) Foreign Application Priority Data
Apr. 28, 2011  (DE) .......................... 10 2011 018 918

(51) Int. Cl.
*H04B 1/44*    (2006.01)
*H04B 1/48*    (2006.01)

(52) U.S. Cl.
CPC ... *H04B 1/44* (2013.01); *H04B 1/48* (2013.01)

(58) Field of Classification Search
None
See application file for complete search history.

(56) References Cited

U.S. PATENT DOCUMENTS

| | | | |
|---|---|---|---|
| 7,656,251 B1 * | 2/2010 | Bauder et al. ................. | 333/133 |
| 2002/0090974 A1 * | 7/2002 | Hagn ............................ | 455/552 |
| 2004/0227585 A1 | 11/2004 | Taniguchi et al. | |
| 2004/0257172 A1 * | 12/2004 | Schmidhammer et al. ... | 333/133 |
| 2007/0038969 A1 | 2/2007 | Pitkary et al. | |
| 2007/0218846 A1 | 9/2007 | Neill et al. | |
| 2008/0024243 A1 | 1/2008 | Iwaki et al. | |

(Continued)

FOREIGN PATENT DOCUMENTS

| | | |
|---|---|---|
| DE | 102006031548 A1 | 1/2008 |
| DE | 102008045346 A1 | 3/2010 |
| DE | 102010046794 A1 | 3/2012 |

(Continued)

OTHER PUBLICATIONS

Beaudin et al., "A New SAW Band Reject Filter and its Applications in Wireless Systems", 2002 IEEE Ultrasonics Symposium Proceedings, vol. 1, Nov. 8, 2002, pp. 147-151.

(Continued)

*Primary Examiner* — Alejandro Rivero
(74) *Attorney, Agent, or Firm* — McDermott Will & Emery LLP

(57) ABSTRACT

The present invention relates to a circuit assembly which comprises an antenna path (A1), which can be connected to a first antenna (ANT1), a transmission path (TX1), a reception path (RX1), a duplexer (DPX1), operating with acoustic waves, which connects the transmission and reception paths (TX1, RX1) in each case to the antenna path (A1), and means for suppressing an interference signal.

8 Claims, 11 Drawing Sheets

(56) References Cited

U.S. PATENT DOCUMENTS

2008/0068109 A1* 3/2008 Schmidhammer ............ 333/133
2008/0261651 A1* 10/2008 Nakahashi ........... H04B 1/0057
          455/553.1

FOREIGN PATENT DOCUMENTS

| | | |
|---|---|---|
| DE | 102011011377 A1 | 8/2012 |
| EP | 1653615 A1 | 5/2006 |
| WO | WO-2007/038969 A1 | 4/2007 |

OTHER PUBLICATIONS

Gu, "RF Front-End Modules in Cellular Handsets", IEEE CSIC Digest, Oct. 24, 2004, pp. 225-228.

Shibagaki et al., "Saw Antenna Duplexer Module Using Saw-Resonator-Coupled Filter for PCN System", 1998 IEEE Ultrasonics Symposium, Oct. 5, 1998, pp. 13-16.

Schmidhammer et al., "BAW Components for PCS-CDMA Applications", 2005 IE Ultrasonics Symposium, vol. 1, Sep. 18, 2005, pp. 89-92.

* cited by examiner

DEVICE, MODULE AND CIRCUIT ASSEMBLY FOR WIRELESS COMMUNICATIONS, AND CONFIGURED FOR INTERFERENCE SUPPRESSION VIA USE OF FIRST AND SECOND PHASE SHIFTERS, A BAND STOP FILTER AND/OR A DIVERSITY DUPLEXER CIRCUIT

The invention relates to a circuit which comprises a duplexer operating with acoustic waves.

In filters operating with acoustic waves electroacoustic transducers convert between RF signals and acoustic waves. Such transducers can be interdigital transducers (IDT) having a comb structure and can operate with surface acoustic waves (SAW) with bulk acoustic waves (BAW) or with guided bulk acoustic waves (GBAW). Such transducers generally comprise intermeshing, but electrically insulated electrode fingers interconnected with busbars, or electrically insulated plates between which a piezoelectric or ferroelectric material is situated.

Known filters operating with acoustic waves exhibit the problem of so-called nonlinearities. The term nonlinearity denotes the occurrence or arising of interfering frequency components generated by filter structures not operating completely linearly.

It is an object of the invention to specify a circuit assembly with duplexer which has an improved linearity.

This object is achieved by means of a circuit assembly according to claim 1.

A circuit assembly is proposed which comprises an antenna path, which can be connected to a first antenna, a transmission path, a reception path and a duplexer operating with acoustic waves, which connects the transmission and reception paths in each case to the antenna path, and which furthermore comprises means for suppressing an interference signal.

In filters operating with acoustic waves, interfering frequency components of higher orders arise on account of the nonlinearities of the filter. Alongside the desired first-order basic frequencies, second-order interference, third-order interference and interference of higher orders can occur. In this case, the third-order interference is particularly interfering since the frequencies thereof can be of the order of magnitude of the basic frequencies.

An interference signal can arise if, for example, a Tx signal and an interference signal impinge on a nonlinear duplexer. In this case, alongside the Tx frequency actually to be emitted, frequencies at multiples of the Tx frequency are also generated, which can in turn mix together to form higher-order interference frequencies. Furthermore, an interference signal can also be received by the antenna and interfere with signal transfer in the transmission and/or reception path.

The means for suppressing an interference signal reduce the power of the interference signal which is coupled into the transmission and/or reception path. The means for suppressing an interference signal can also better separate the transmission and reception paths from one another in order thus to prevent the transmission signal from being coupled into the reception path.

A first possibility for realizing the means for suppressing an interference signal is to arrange a band-stop filter in the antenna path. The band-stop filter having a stop band adapted to the interference signals significantly reduces the power of an interference signal, such that only a fraction of the interference signal actually reaches the duplexer. The band-stop filter can be realized by integrated passive components, by discrete components or by acoustic components such as SAW filters or BAW filters.

In one embodiment of the circuit assembly a first phase shifter is interconnected between the antenna path and the transmission path. In this case, such a phase shifter can comprise a $\lambda/4$ line. A phase shifter comprising LC elements is also appropriate as a phase shifter which occupies less space than a phase shifter comprising a $\lambda/4$ line.

Such a phase shifter is advantageously transmissive to transmission signals or the frequencies thereof and blocks reception signals or the frequencies thereof.

Furthermore, a second phase shifter can be interconnected between the antenna path and the reception path. The second phase shifter is advantageously transmissive to reception signal or the frequencies thereof and blocks transmission signal or the frequencies thereof.

In one embodiment of the circuit assembly, the latter comprises a node in the antenna path, wherein the node is connected to a further signal path, in which a filter is connected to ground in series via an impedance. The filter can be a bandpass filter, the passband of which corresponds to the frequencies of an interference signal, such that the interference signal is dissipated to ground via the further signal path SP. Alternatively, the filter can also be a high-pass filter or a low-pass filter.

In a further exemplary embodiment, a second duplexer is arranged in the antenna path, wherein the second duplexer connects the antenna to a first path, which is connected to the first duplexer, and to a second path, which is connected to ground via an impedance.

In this case, the second duplexer has two filters. These filters can be low-pass filters, high-pass filters or bandpass filters. Instead of the filters, an interconnection with respect to ground without series-connected elements is also possible.

A further possibility for realizing the means for suppressing the interference signal is afforded by a so-called diversity duplexer circuit. In this case, the circuit assembly can comprise a second antenna path, which can be connected to a second antenna, a second transmission path, a second reception path and a second duplexer operating with acoustic waves, which connects the second transmission and the second reception paths to the second antenna path, wherein the first antenna path can be used for transmitting and receiving signals in a first frequency band and the second antenna path can be used for transmitting and receiving signals in a second frequency band.

The first antenna path can be used as a diversity reception path for signals in the second frequency band. Furthermore, the second antenna path can be used as a diversity reception path for signals in the first frequency band. Accordingly, the first antenna path can be connected to a first diversity reception path, and the second antenna path can be connected to a second diversity reception path.

Furthermore, the first and/or the second diversity path can be connected to a further duplexer, which connects the diversity reception path to a diversity Rx path and a diversity Tx path, wherein each diversity Tx path is connected to ground via an impedance. Accordingly, the diversity duplexer uses from the duplexer only the reception branch, while the transmission branch of the duplexer is connected to ground via an impedance. An interference power is dissipated via the diversity Tx path of the diversity duplexer, such that the power of the interference signal is suppressed as well as possible in the diversity Rx path.

The different configurations of the means for suppressing an interference signal can furthermore be combined with one another in any desired manner.

A further possibility of improving the linearity of the circuit assembly consists in the realization of a highly linear duplexer operating with acoustic waves. For this purpose, the number of fingers can be increased, the metallization ratio can be reduced or a cascading of the filters can be implemented. A reduction of the finger currents also leads to an improved linearization of a duplexer.

Furthermore, the invention relates to a module into which a circuit assembly according to any of claims 1 to 10 is integrated. This module can be used in a device for wireless communication.

The invention is explained in greater detail below on the basis of exemplary embodiments and the associated figures. The figures show various exemplary embodiments of the invention on the basis of schematic illustrations that are not true to scale.

FIG. 1 shows the relative frequency of different interfering signals composed of interference of different orders.

FIG. 2*a* shows a first circuit assembly, wherein the means for suppressing an interference signal are arranged in the antenna path.

FIG. 2*b* shows a circuit assembly wherein an interference signal from the antenna path is dissipated to ground.

FIG. 2*c* shows a diversity diplexer circuit.

Figure 6A:
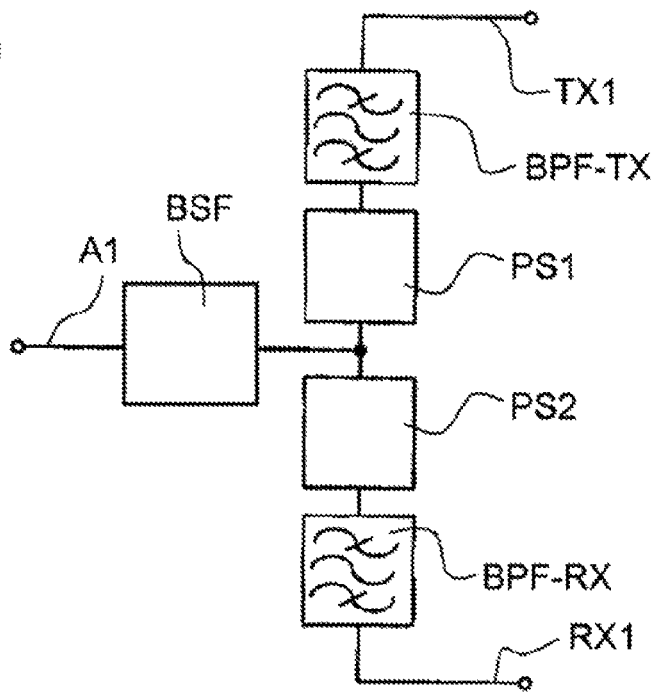

FIG. 6*a* shows a third circuit assembly, wherein means for suppressing an interference signal are arranged in each case in the antenna path and in the transmission and reception paths.

Figure 6B:
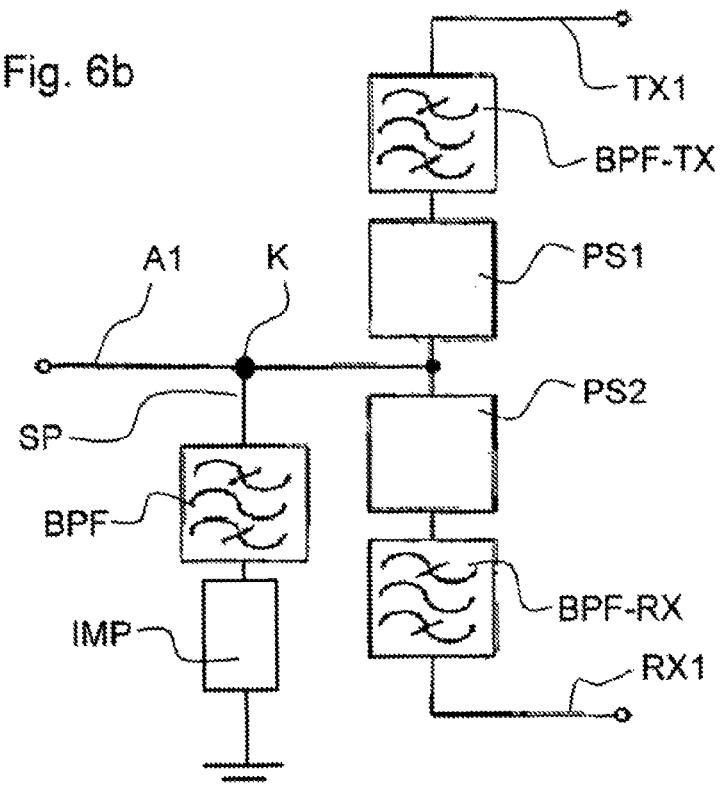

FIG. 6*b* shows a first variant of the circuit assembly shown in FIG. 6*a*.

Figure 6C:
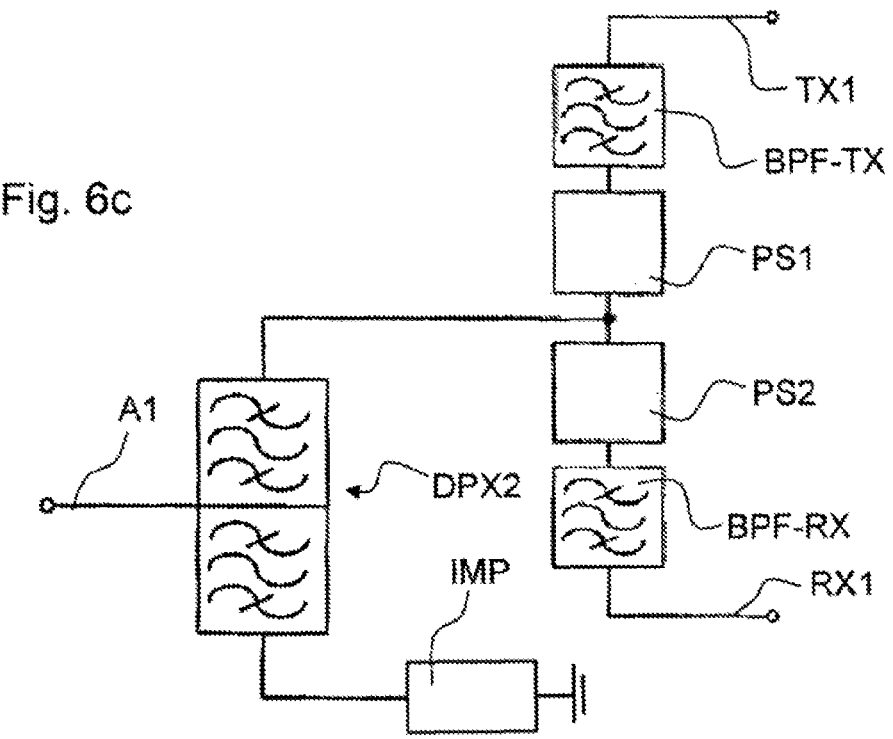

FIG. 6*c* shows a second variant of the circuit assembly shown in FIG. 6*a*.

Figure 7A:
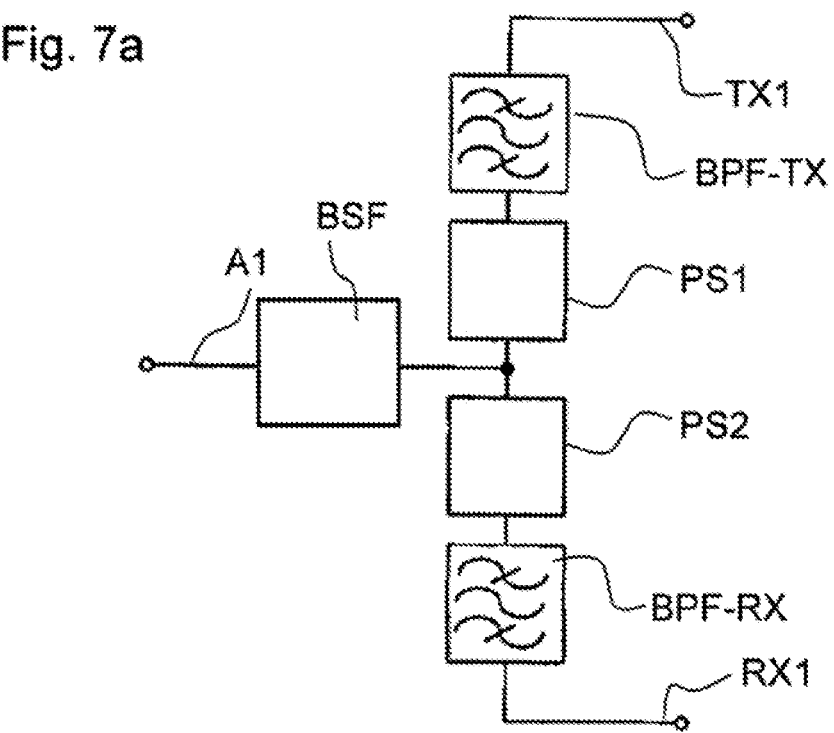
Figure 7A:
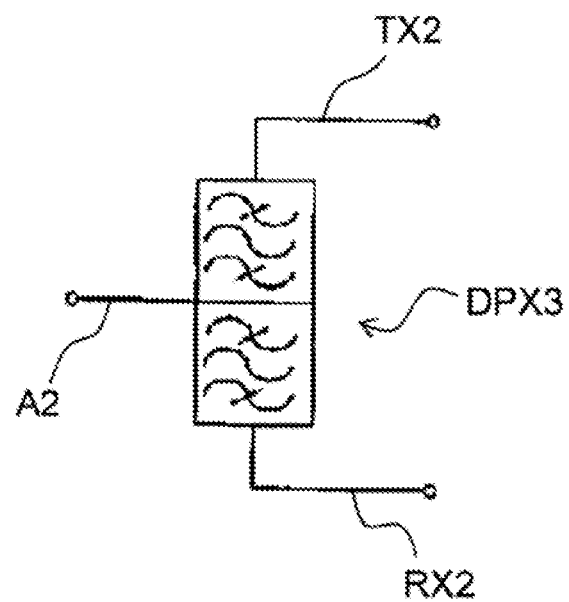

FIG. 7*a* shows a further circuit assembly, comprising two antennas.

Figure 7B:
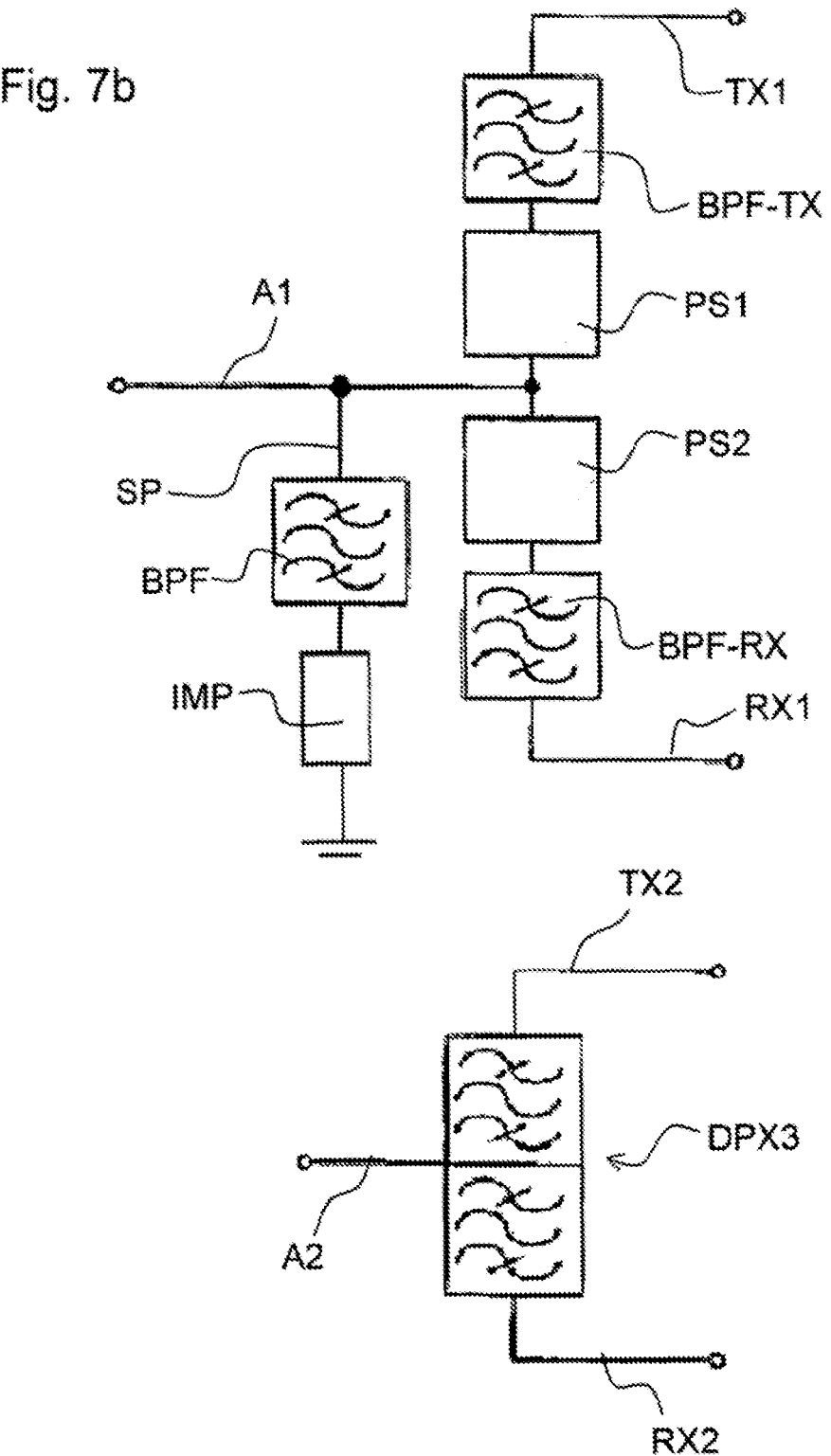

FIG. 7*b* shows a first variant of the circuit assembly shown in FIG. 7*a*.

Figure 7C:
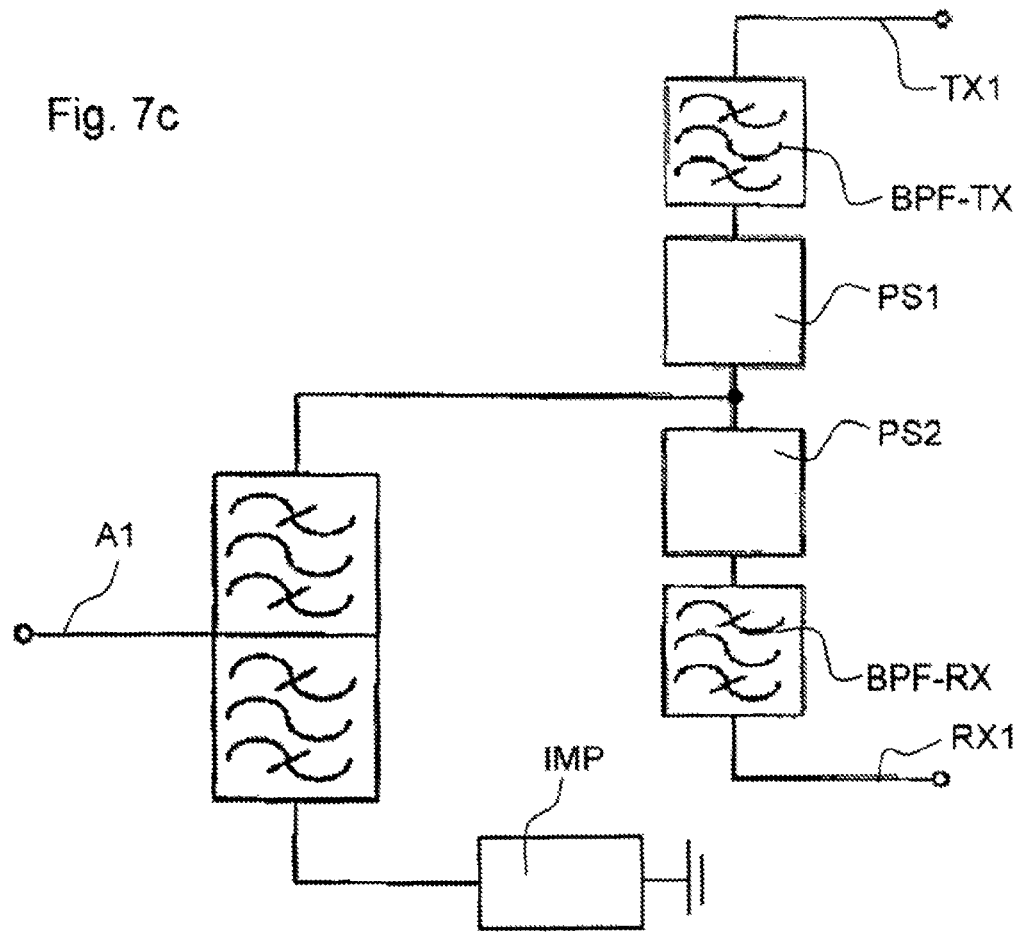
Figure 7C:
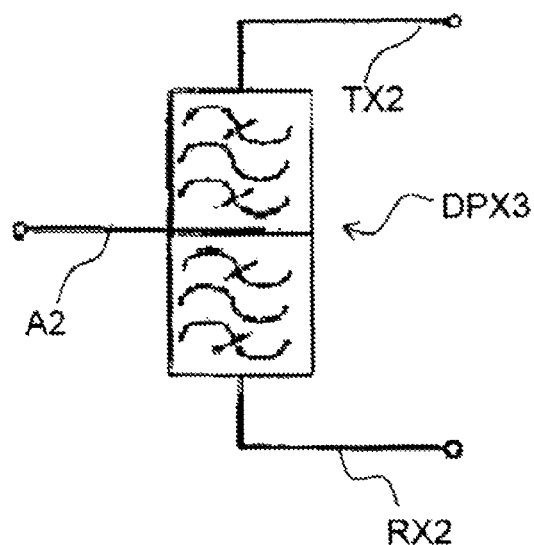

FIG. 7*c* shows a second variant of the circuit assembly shown in FIG. 7*a*.

Figure 8A:
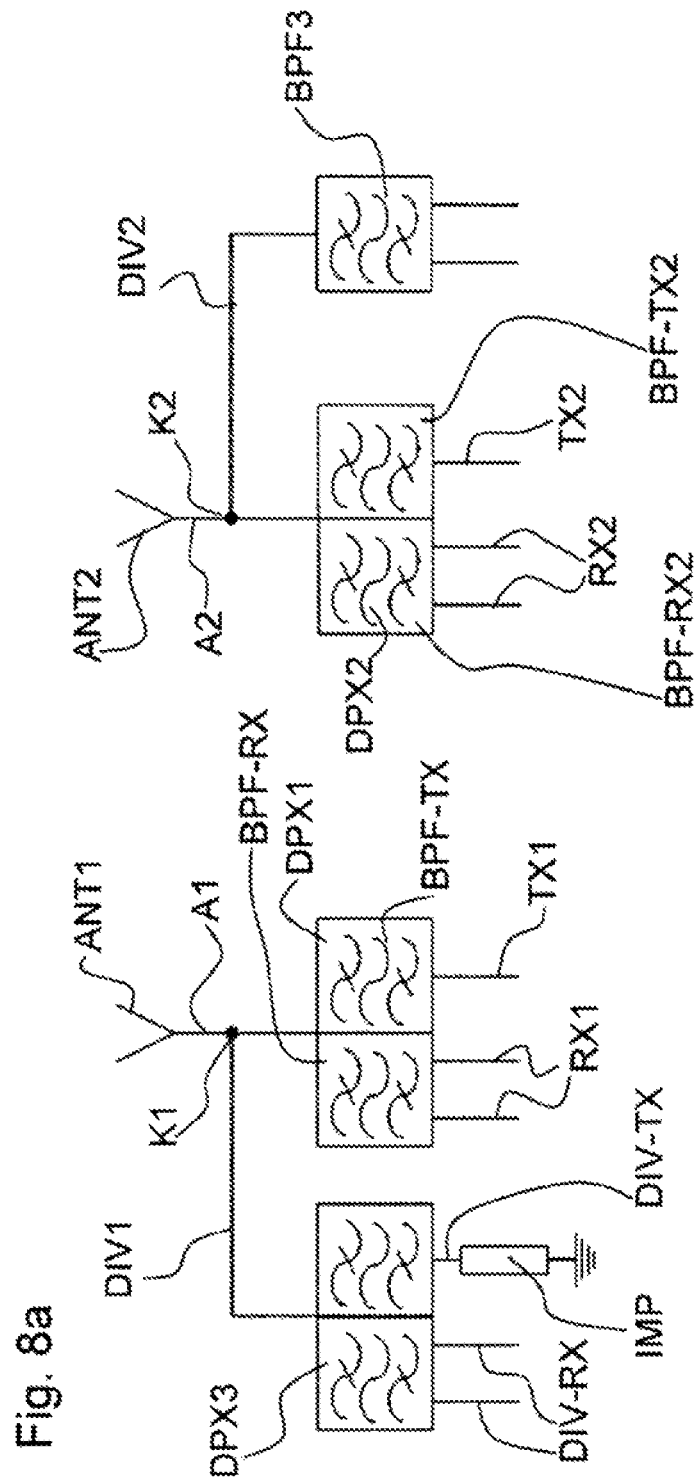

FIG. 8*a* shows the construction of a diversity duplexer.

Figure 8B:
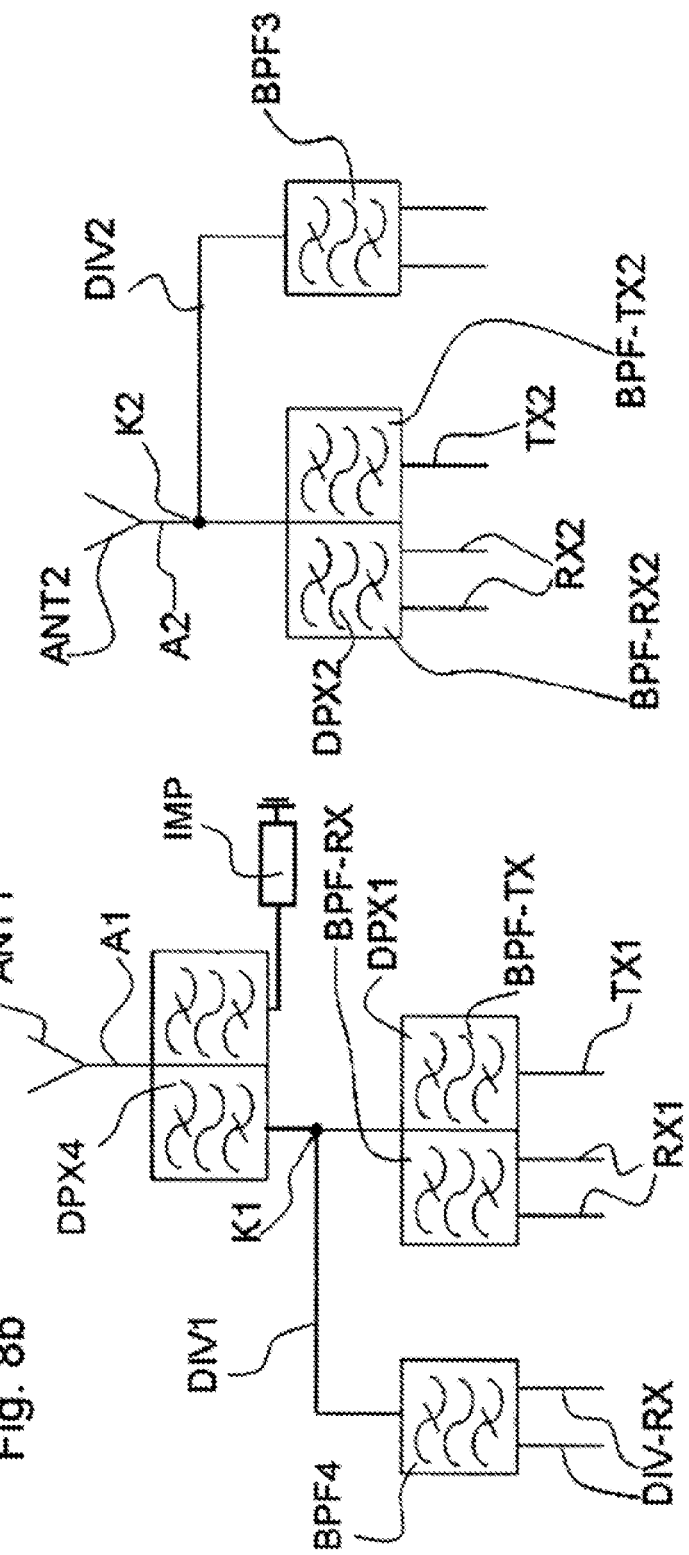

FIG. 8*b* shows a variation of the circuit assembly shown in FIG. 8*a*.

Figure 9:
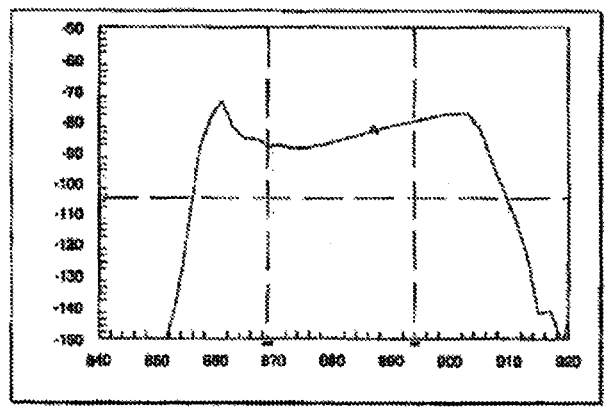

FIG. 9 shows the nonlinearity of a conventional band V duplexer.

Figure 10:
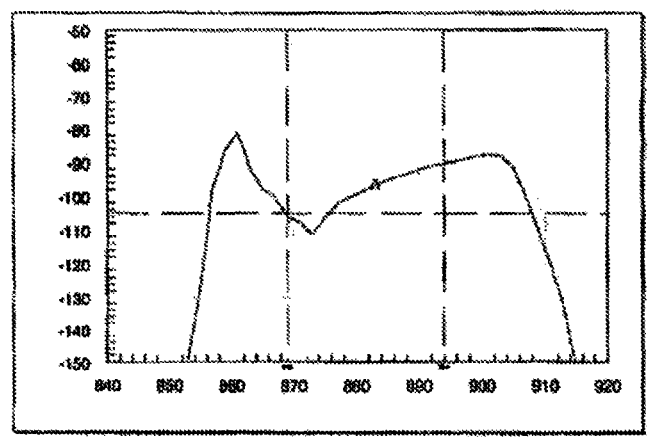

FIG. 10 shows the nonlinearity of a diversity duplexer.

Figure 11:
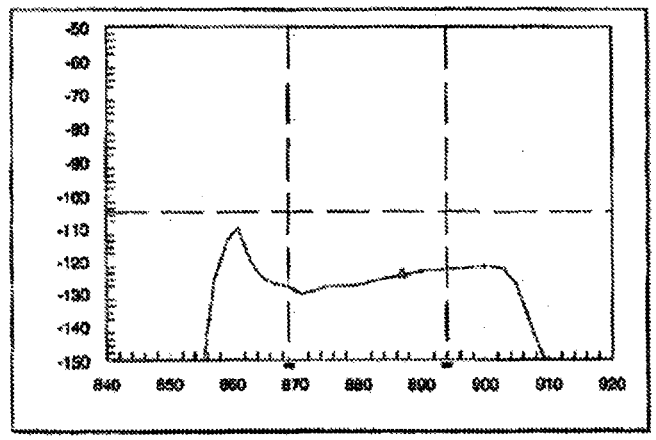

FIG. 11 shows the nonlinearity of the filter, with arrangement of a band-stop filter in the antenna path.

Figure 1:
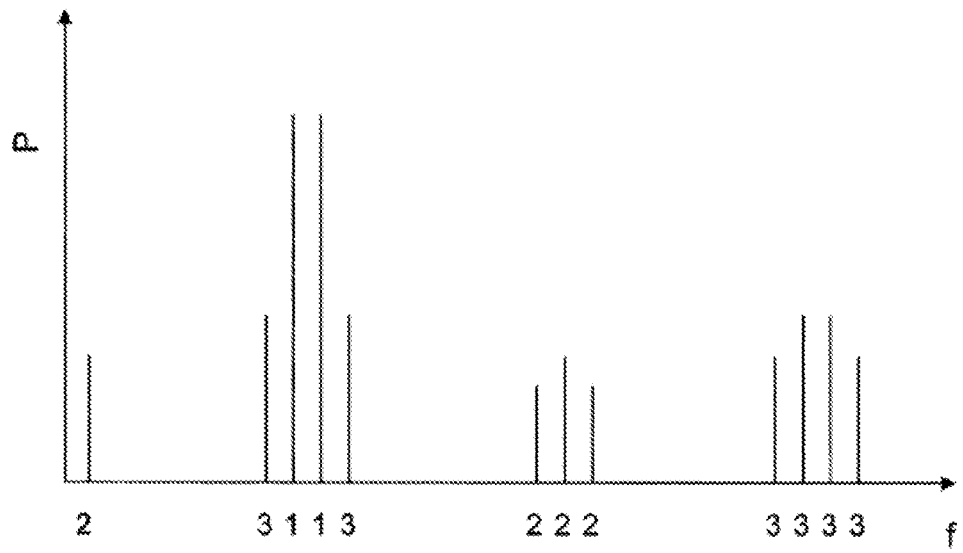

FIG. 1 illustrates the relative arrangement of the frequencies f of RF signals of different orders. The ordinate is a measure of the power P. Desired first-order basic frequencies are designated by "1". The absolute values of the second-order interference frequencies, "2", differ from the basic frequencies substantially by the absolute values of the basic frequencies themselves. Therefore, the frequency differences between basic frequencies "1" and second-order interference frequencies "2" are relatively large. Such frequencies can be eliminated well by bandpass filters, high-pass filters or low-pass filters.

Frequencies designated by "3" are third-order interfering frequencies. The latter differ from second-order interfering frequencies "2" by frequency differences at the level of the basic frequencies. Therefore, third-order interference frequencies generally exist approximately at frequencies of the basic signals. Such interference frequencies "3" cannot or cannot sufficiently be filtered out by conventional filter measures.

The present invention specifies a circuit assembly wherein the poorly eliminable third-order interference frequencies "3" occur with significantly reduced intensity.

One example of frequencies at which third-order mixed products lead to problems is formed by the LTE bands V and XIII. The transmission band of band V extends over the frequency range of 824 to 849 MHz and the transmission band of band XIII extends over the frequency range of 777 to 787 MHz. If Tx signals from bands V and XIII mix together, frequencies can arise which lie in the Rx frequency spectrum of band V (869 to 894 MHz).

Alongside the combination of band V and band XIII, there are even further band combinations which lead to the same problem situation. Interference signals having frequencies that lie in the transmission or reception range of a band can also arise as a result of higher-order, for example fifth-order, mixed terms or as a result of three signals being mixed. The problem is in no way restricted to LTE frequency bands. By way of example, WLAN signals having a frequency of 2.4 GHz and LTE transmission signals from band VII can lead to mixed terms lying in the Rx frequency spectrum of band VII.

Figure 2A:
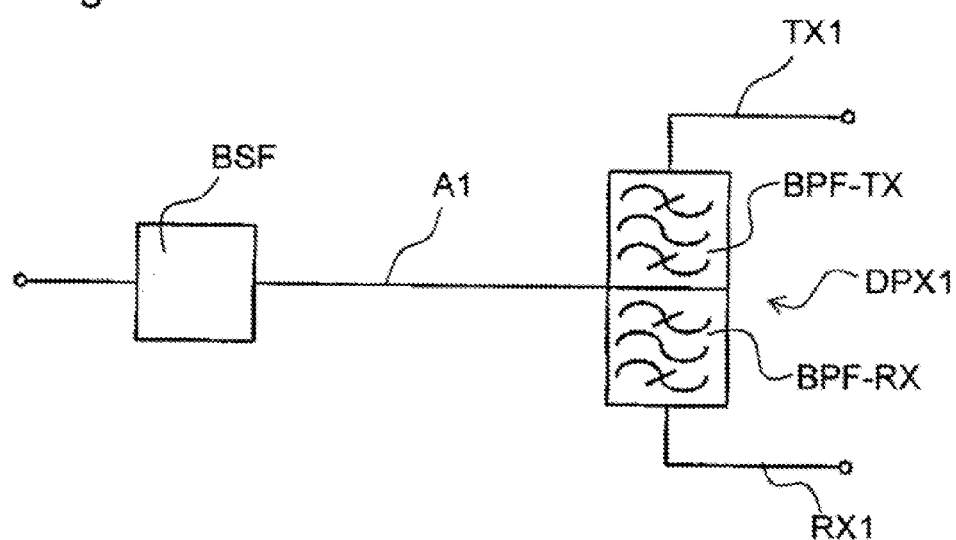

FIG. 2*a* shows a first exemplary embodiment of the circuit assembly according to the invention. The circuit assembly comprises an antenna path A1, a transmission path TX1 and a reception path RX1. The antenna path A1 can be connected to an antenna (not illustrated in FIG. 2*a*).

A duplexer DPX1 connects the transmission path TX1 and the reception path RX1 in each case to the antenna path A1. The duplexer DPX1 is a filter operating with acoustic waves and having a Tx filter BPF-TX and an Rx filter BPF-RX. The Tx filter BPF-TX is a bandpass filter which connects the transmission path TX1 to the antenna path A1, and the Rx filter BPF-RX is a bandpass filter which connects the reception path RX1 to the antenna path A1.

Furthermore, a band-stop filter BSF is arranged in the antenna path A1. The band-stop filter BSF makes it possible to significantly reduce the power of an interference signal which is coupled into the antenna, such that only a fraction of the power reaches the duplexer DPX1.

In the example discussed above in which the circuit assembly is designed for data transfer in the LTE band V, a band-stop filter BSF that suppresses the frequencies of the LTE band XIII is arranged in the antenna path and brings about there a sufficiently great suppression of the interference frequencies from this frequency range.

The outputs of the Tx filter BPF-TX and of the Rx filter BPF-RX are unbalanced in FIG. 2*a*. A configuration of the circuit shown in FIG. 2*a* in which the output of the Tx filter BPF-TX and/or the output of the Rx filter BPF-RX are/is balanced is furthermore possible as well.

Figure 2B:
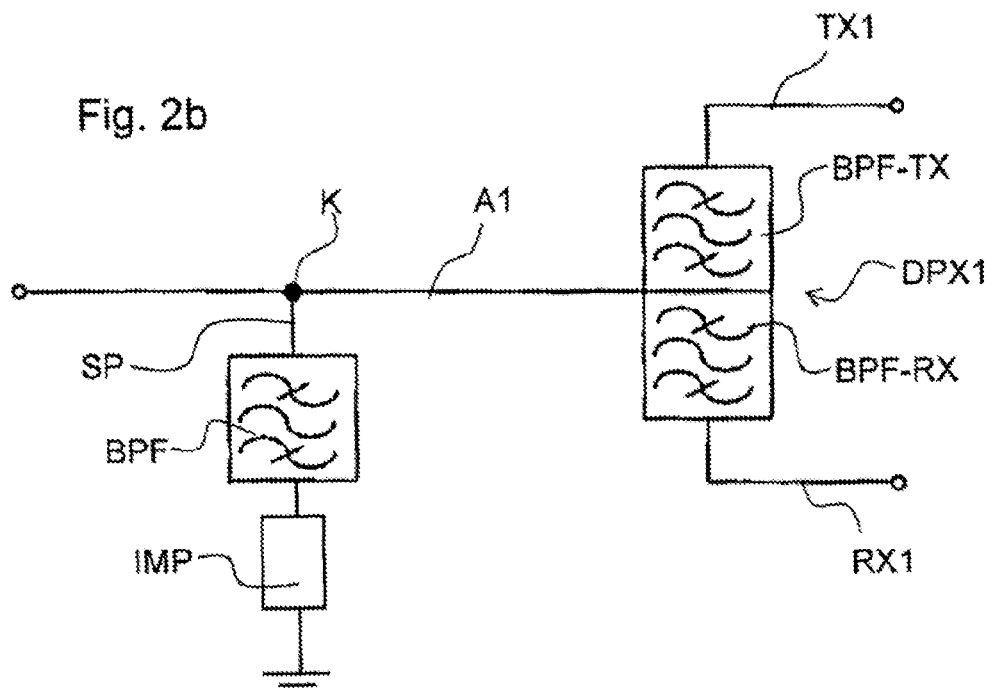

FIG. 2*b* shows a variation of the circuit assembly shown in FIG. 2*a*. A node K is arranged in the antenna path A1, said node connecting the antenna path A1 to a further signal path SP. In the further signal path SP, the node K is connected to ground via a filter BPF and an impedance IMP.

The filter BPF is a bandpass filter. The passband of the bandpass filter BPF is chosen in such a way that it corresponds as well as possible to the frequency spectrum of an interference signal. An interference signal that couples into the antenna path A1 is accordingly dissipated to ground via the bandpass filter. The filter BPF in the signal path SP can alternatively also be a high-pass filter or a low-pass filter.

In this variant of the circuit assembly, too, the outputs of the Tx filters BPF-TX and/or of the Rx filters BPF-RX can be configured as balanced or unbalanced.

Figure 2C:
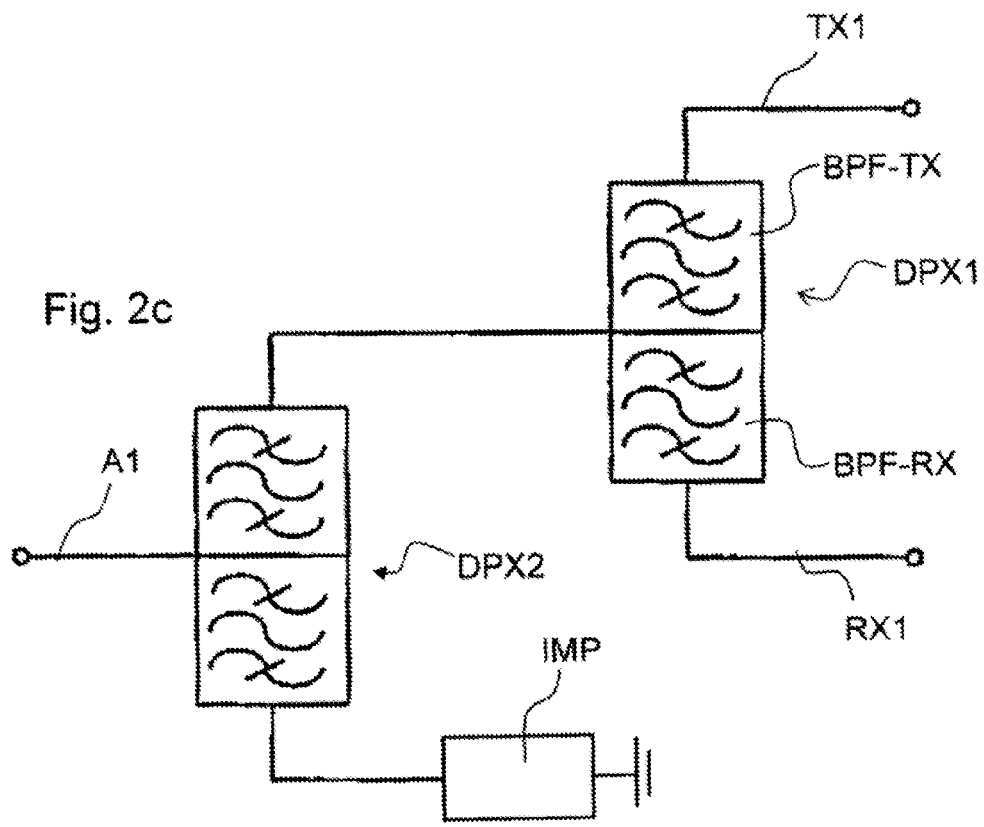

Furthermore, FIG. 2c shows a second variant of the circuit assembly. The circuit assembly shown in FIG. 2c is a so-called diversity diplexer. A second duplexer DPX2 is arranged in the antenna path A1, the input port of which second duplexer being connected to the antenna path A1. A first output port of the second duplexer DPX2 is connected to the input of the first duplexer DPX1. Furthermore, the second output port of the second duplexer DPX2 is interconnected with ground via an impedance IMP.

The second duplexer DPX2 has two filters. The filters of the second duplexer DPX2 are selected from high-pass, low-pass and bandpass filter. In this case, the filters are chosen in such a way that an interference signal is dissipated to ground via the impedance IMP.

The outputs of the filters of the first and second duplexers DPX, DPX2 can be realized as balanced or unbalanced.

Figure 3:
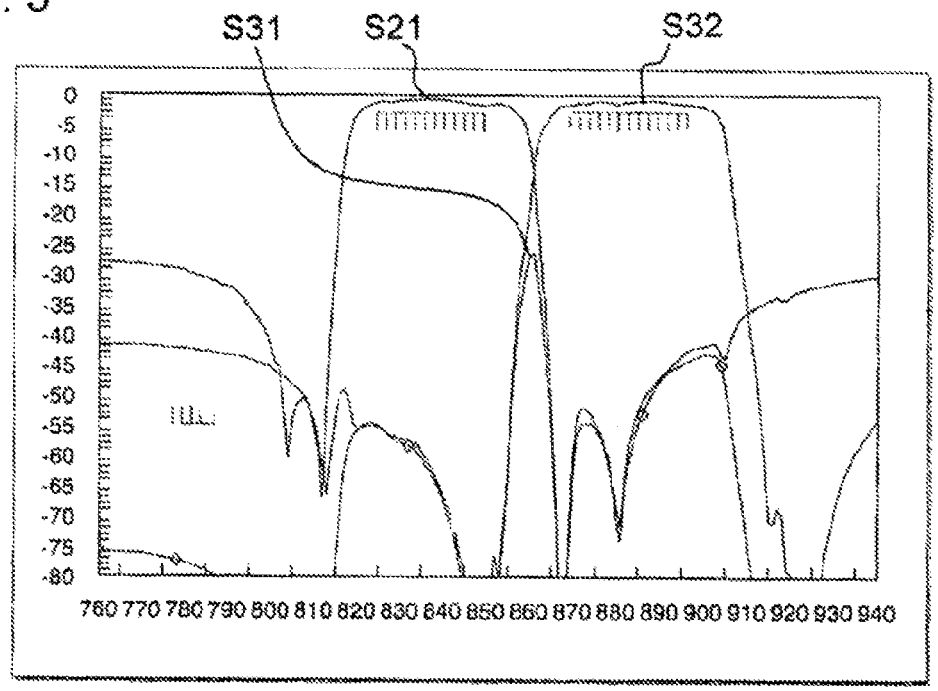
FIG. 3 shows the transfer function of a band V duplexer.

FIG. 3 shows the transfer characteristic of a duplexer DPX1 which is designed for data transfer in band V and in which no band-stop filter BSF is arranged in the antenna path A1.

The curve $S_{21}$ describes the insertion loss of the Tx filter, i.e. the transmission from the transmission port to the antenna port as a function of the frequency of the signal. The curve $S_{32}$ describes the insertion loss of the Rx filter, i.e. the transmission from the antenna port to the reception port as a function of the frequency of the signal. The curve $S_{31}$ describes the isolation of the duplexer, i.e. the transmission of a signal from the transmission port 1 to the reception port 3.

FIG. 3 shows that a sufficiently low insertion loss $S_{21}$ of the Tx filter is achieved in the transmission range of the LTE band V, and that a sufficiently low insertion loss $S_{32}$ of the Rx filter is achieved in the reception range of the LTE band V. However, it can also clearly be discerned that interference signals are suppressed only slightly in the range of band XIII. These signals can crucially interfere with data transfer in band V.

Figure 4:
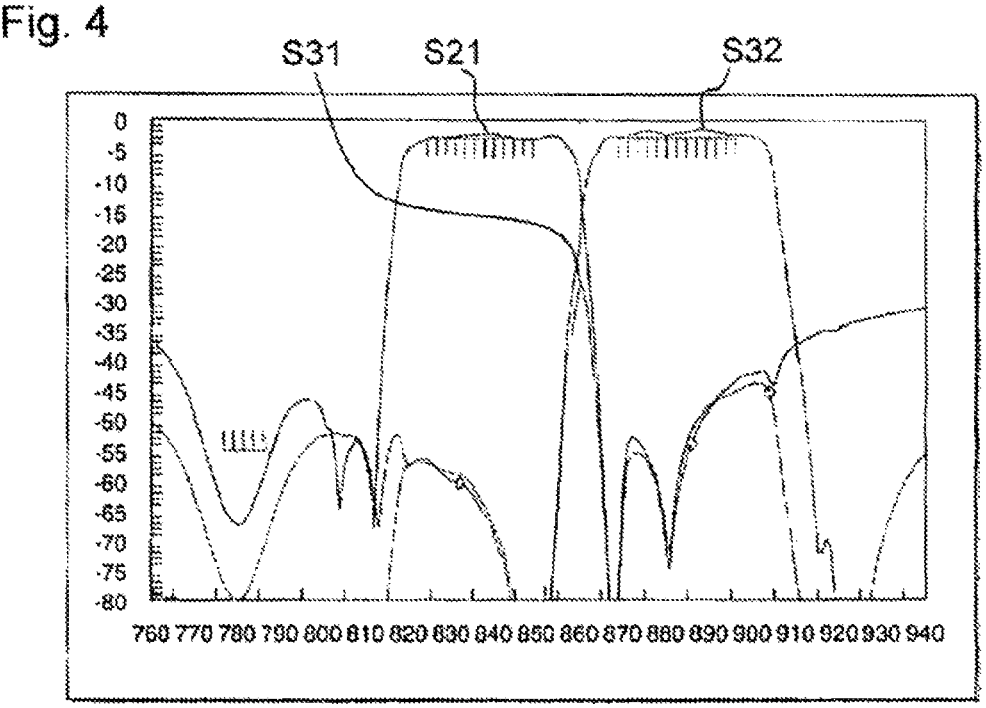
FIG. 4 shows the transfer function of a band V duplexer wherein a band-stop filter is arranged in the antenna path.

FIG. 4 shows the transfer characteristic for a circuit assembly according to the invention, in which, as shown in FIG. 2a, a band-stop filter BSF is arranged in the antenna path A1. It can clearly be discerned here that the signal strength is greatly reduced in the frequency range of band XIII. Accordingly, the data transfer in band V is now influenced to a lesser extent by interference signals from band XIII.

Figure 5:
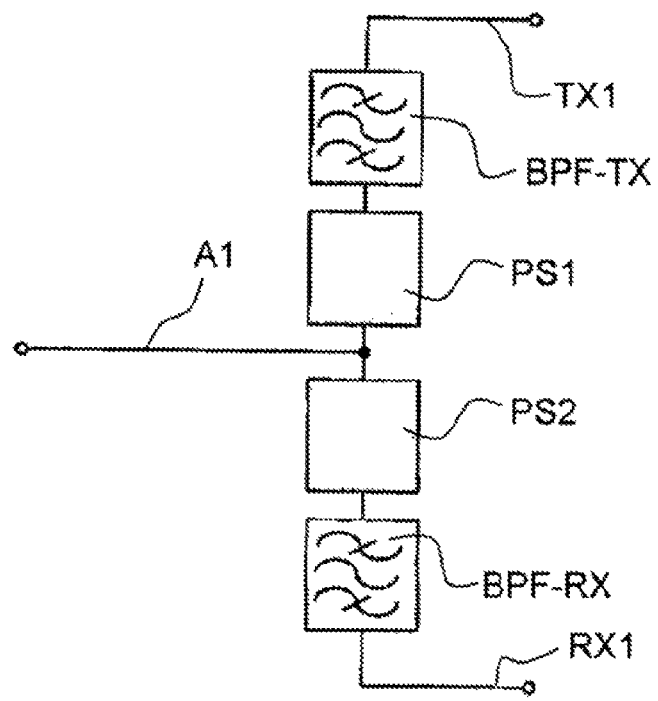
FIG. 5 shows a second circuit assembly, wherein means for suppressing an interference signal are arranged in the transmission and reception paths.

FIG. 5 shows a second configuration of the means for reducing an interference signal. The circuit assembly in FIG. 5 comprises two phase shifters PS1, PS2. A first phase shifter PS1 is arranged between the antenna path A1 and the reception path RX1. A second phase shifter PS2 is arranged between the antenna path A1 and the transmission path TX1. The phase shifters PS1, PS2 improve the separation of transmission and reception signals and furthermore enable the power of an interference signal to be reduced.

FIG. 6a shows a further configuration of the circuit assembly according to the invention. The circuit assembly shown in FIG. 6a comprises a band-stop filter BSF in the antenna path A1 and furthermore a respective phase shifter PS1, PS2 between antenna and transmission paths A1, TX1 and respectively between antenna and reception paths A1, RX1. Accordingly, the circuit shown in FIG. 6 combines the means for suppressing the interference signals shown in FIGS. 2a and 5.

The outputs of the Tx filter BPF-TX and of the Rx filter BPF-RX are unbalanced in FIG. 6a. A configuration of the circuit shown in FIG. 6a in which the output of the Tx filter BPF-TX and/or the output of the Rx filter BPF-RX are/is balanced is furthermore possible as well.

FIG. 6b shows a variation of the circuit assembly shown in FIG. 6a in which the means for suppressing the interference signals shown in FIGS. 2b and 5 are combined with one another. Instead of the band-stop filter BSF, a node K is arranged in the antenna path A1, said node connecting the antenna path A1 to a further signal path SP. In the further signal path SP, the node K is connected to ground via a filter BPF and an impedance IMP.

The filter BPF is a bandpass filter. The passband of the bandpass filter BPF is chosen in such a way that it corresponds as well as possible to the frequency spectrum of an interference signal. An interference signal that couples into the antenna path A1 is accordingly dissipated to ground via the bandpass filter. The filter in the signal path SP can alternatively also be a high-pass filter or a low-pass filter.

In this variant of the circuit assembly, too, the outputs of the Tx filter BPF-TX and/or of the Rx filters BPF-RX can be configured as balanced or unbalanced.

Furthermore, FIG. 6c shows a second variant of the circuit assembly in accordance with FIG. 6a, in which the means for suppressing the interference signals shown in FIGS. 2c and 5 are combined with one another. A second duplexer DPX2 is arranged in the antenna path A1, the input port of which second duplexer being connected to the antenna path A1. A first output port of the second duplexer DPX2 is connected to the input of the first duplexer DPX. Furthermore, the second output port of the second duplexer is interconnected with ground via an impedance IMP.

The second duplexer DPX2 has two filters. The filters of the second duplexer DPX2 are selected from high-pass, low-pass and bandpass filter. In this case, the filters are chosen in such a way that an interference signal is dissipated to ground via the impedance.

The outputs of the filters of the first and second duplexers DPX, DPX2 can be realized as balanced or unbalanced.

FIG. 7a shows a further configuration of the circuit assembly according to the invention. The circuit assembly in accordance with FIG. 7a comprises a second antenna path A2, which is connected to a second antenna ANT2, a second reception path RX2 and a second transmission path TX2. The second antenna path A2 is connected to the second reception path RX2 and the second transmission path TX2 via a third duplexer DPX3.

The first antenna path A1, connected to a first antenna ANT1 is used for transmitting and receiving signals in a first frequency band. The second antenna path A2 is used for transmitting and receiving signals in a second frequency band. The signals emitted by the second antenna ANT2 are also received by the first antenna ANT1 and coupled into the first antenna path A1. They act as interference signals here. In comparison with a circuit in which the two antenna paths A1, A2 are connected to a common antenna, the isolation between the signals of the first frequency band and of the second frequency band is increased by a separation into two separate antennas ANT1, ANT2. The isolation between the two antennas ANT1, ANT2 is approximately 5 to 10 dB.

Furthermore, the power of the interference signal is reduced further by means of a band-stop filter BSF in the first antenna path A1 and the arrangement of phase shifters PS1, PS2 between the first antenna path A1 and the first reception path RX1 and between the first antenna path A1 and the first transmission path TX1.

The outputs of the Tx filter BPF-TX and of the Rx filter BPF-RX are unbalanced in FIG. 7a. A configuration of the circuit shown in FIG. 7a in which the output of the Tx filter BPF-TX and/or the output of the Rx filter BPF-RX are/is balanced is furthermore possible as well.

FIG. 7b shows a variation of the circuit assembly shown in FIG. 7a. Instead of the band-stop filter BSF, a node K is arranged in the antenna path A1, said node connecting the antenna path A1 to a further signal path SP. In the further signal path SP, the node K is connected to ground via a filter BPF and an impedance IMP.

The filter BPF is a bandpass filter. The passband of the bandpass filter BPF is chosen in such a way that it corresponds as well as possible to the frequency spectrum of an interference signal. An interference signal that couples into the antenna path A1 is accordingly dissipated to ground via the bandpass filter. The filter in the signal path S can alternatively also be a high-pass filter or a low-pass filter.

In this variant of the circuit assembly, too, the outputs of the Tx filter BPF-TX and/or of the Rx filters BPF-RX can be configured as balanced or unbalanced.

Furthermore, FIG. 7c shows a second variant of the circuit assembly in accordance with FIG. 7a. A second duplexer DPX2 is arranged in the antenna path A1, the input port of which second duplexer being connected to the antenna path A1. A first output port of the second duplexer DPX2 is connected to the input of the first duplexer DPX. Furthermore, the second output port of the second duplexer DPX2 is interconnected with ground via an impedance IMP.

The second duplexer DPX2 has two filters. The filters of the second duplexer DPX2 are selected from high-pass, low-pass and bandpass filter. In this case, the filters are chosen in such a way that an interference signal is dissipated to ground via the impedance.

The outputs of the filters of the first and second duplexers DPX, DPX2 can be realized as balanced or unbalanced.

A further possibility for suppressing an interference signal is a so-called diversity duplexer circuit assembly. The latter is illustrated in FIG. 8a.

The circuit assembly illustrated in FIG. 8a comprises a first antenna path A1, which is connected to a first antenna ANT1. The first antenna path A1 is connected to a first duplexer DPX1. The first duplexer DPX1 is in turn connected to a first reception path RX1 and a first transmission path TX1. The duplexer DPX1 has two bandpass filters, the Tx filter BPF-TX and the Rx filter BPF-RX. The first reception path RX1 is configured as balanced. The first transmission path TX1 is single-ended. The first antenna ANT1 and also the first transmission and the first reception paths TX1, RX1 can be used for example for CDMA voice data transfer in band V.

Furthermore, the circuit assembly illustrated in FIG. 8a comprises a second antenna ANT2, which is connected to a second antenna path A2. The second antenna path A2 is connected to a second duplexer DPX2, which has two bandpass filters, a second Tx filter BPF-TX2 and a second Rx filter BPF-RX2. The second duplexer DPX2 is connected to a second reception path RX2, which is configured as balanced, and a second transmission path TX2 which is single-ended. The second antenna ANT2 and the second transmission and the second reception paths TX2, RX2 are used for transmitting LTE data in band XIII.

The isolation between the first and the second antennas ANT1, ANT2 is approximately 10 dB.

In the LTE standard, a diversity antenna is provided alongside a so-called main antenna, which is used as transmitting and receiving antenna. Here, the second antenna ANT2 is the main antenna for data transfer in the LTE band XIII. The first antenna ANT1 is used as a diversity Rx LTE antenna for data in band XIII.

Therefore, the first antenna path A1 is connected to a first diversity path DIV1 via a node K1. The first diversity path DIV1 has a further duplexer DPX3, which in turn has two bandpass filters. The further duplexer DPX3 is connected to a diversity Rx path DIV-RX and a diversity Tx path DIV-TX. The diversity Tx path DIV-TX is connected to ground via an impedance IMP, for example 50 Ohms. Accordingly, the diversity Tx path DIV-TX can be used here for dissipating an interference signal.

Furthermore, the second antenna ANT2 is used as a diversity Rx antenna for the CDMA voice data from band V which are transmitted and received by the first antenna ANT1. The second antenna path A2 is connected to a bandpass filter BPF3 via a second node K2. The bandpass filter BPF3 has a balanced output, which is connected to a second diversity Rx reception path DIV-RX2.

It would furthermore be possible to replace the bandpass filter BPF3 by a further duplexer and to connect a diversity Tx path to ground via a further impedance.

Furthermore, in the case of the three duplexers DPX1, DPX2, DPX3, in each case two phase shifters can additionally be arranged between the respective antenna path and the reception path and respectively the transmission path, as shown in FIG. 5, for example.

The advantages of this circuit will now be discussed on the basis of an example. Typical signal strengths in the CDMA voice transmission path, here in the first transmission path TX1, are 27 dB. In the CDMA voice Rx path, here in the first reception path RX1, the signal strength is −95 dB.

The LTE band XIII data emitted by the second antenna ANT2 represent an interference signal for the data transfer of the first antenna ANT1. In the LTE Tx path TX2, a typical signal strength is approximately 25 dB. If a loss of 3 dB in the duplexer DPX2 is furthermore assumed, then the second antenna ANT2 emits a signal having a signal strength of 22 dB.

Given an isolation of 10 dB between the two antennas ANT1, ANT2 a signal having a signal strength of 12 dB is coupled into the first antenna ANT1. This signal, having frequencies from band XIII, represents an interference signal for the Rx signals of band V. Via the diversity Tx path DIV-TX however, these 12 dB are forwarded to ground and therefore do not interfere with the signals from LTE band V in the first reception path RX1.

Numerous further examples are conceivable in which the circuit assembly disclosed is advantageous. They are not restricted to LTE data transfer. In this regard, by way of example, one antenna can be used for WLAN and Bluetooth, and the other antenna for LTE band VII. In this case, too, interfering superpositions of the signals can occur, wherein the interference signals can be suppressed by the circuit assembly shown in FIG. 8a. It is furthermore likewise possible to use a single antenna for WLAN, Bluetooth and LTE band VII.

FIG. 8b shows a variation of the circuit assembly shown in FIG. 8a. An additional fourth duplexer DPX4 is connected to the first antenna path A1 in such a way that the input of the fourth duplexer DPX4 is connected to the first antenna path A1. The first output of the fourth duplexer DPX4 is connected to the node K1. The second output of the fourth duplexer is in turn interconnected with ground via an impedance IMP. Accordingly, an interference signal that couples in at the first antenna A1 is dissipated to ground via the fourth duplexer DPX4. For this purpose, the fourth duplexer DPX4 has two filters, which are high-pass, low-pass and/or bandpass filters.

Furthermore, the third duplexer DPX3 in accordance with FIG. 8a was replaced by a bandpass filter BPF4. Since interference signals are already dissipated via the second output of the fourth duplexer DPX4, here it is possible to dispense with the arrangement of a third duplexer DPX3 in the first diversity path DIV1.

FIG. 9 shows the power characteristic of a circuit assembly which connects an antenna path A1 to a transmission and a reception path TX1, RX1 by means of a duplexer DPX1. Means for suppressing interference signals are dispensed with here. Signal transfer in band V is furthermore assumed, an interference signal of 25 dB from band XIII being present. FIG. 9 shows the power generated in the Rx path on the basis of the intermodulation of the two signals. A gravely pronounced nonlinearity can be discerned. According to the usual requirements, an allowed power of the intermodulation signal generated of a maximum of −105 dB is required.

FIG. 10 shows the same power characteristic, a diversity duplexer circuit as shown in FIG. 8 now being used. A comparison of FIGS. 9 and 10 shows that the linearity is improved by approximately 10 to 15 dB by means of the diversity duplexer circuit assembly.

FIG. 12 shows the power characteristic for a circuit assembly in which a band-stop filter BSF is arranged in the antenna path A1. Here the power of the interference signal is significantly reduced such that the power can be reduced to less than −105 dB.

A further improvement of the circuit assembly can be achieved by a linearization of the RF components. A nonlinearity which is significantly lower per element can be achieved by means of a cascading of the components.

Further possibilities for improving the linearization of a duplexer are afforded by increasing the number of fingers, reducing the metallization ratio or reducing the finger currents.

The invention described here is not restricted to single-ended arrangements. Filters can be configured as balanced both in the transmission path and in the reception path.

The invention is furthermore not restricted to LTE data transfer, but rather relates to all cases in which two signals lead to an interfering mixed product.

LIST OF REFERENCE SIGNS

1—Basic frequencies
2—Second-order interference frequencies
3—Third-order interference frequencies
A1—Antenna path
TX1—Transmission path
RX1—Reception path
DPX1—Duplexer
BPF-TX—Tx filter
BPF-RX—Rx filter
BSF—Band-stop filter
K—Node
SP—Further signal path
BPF—Bandpass filter
IMP—Impedance
DPX2—Second duplexer
S21—Insertion loss of the Tx filter
S32—Insertion loss of the Rx filter
S31—Isolation of the duplexer
PS1—Phase shifter
PS2—Phase shifter
A2—Second antenna path
TX2—Second transmission path
RX2—Second reception path
DPX3—Third duplexer
ANT1—First antenna
BPF-TX2—Second Tx filter
BPF-RX2—Second Rx filter
K1—Node
K2—Node
DIV1—First diversity path
DPX4—Fourth duplexer
DIV-TX—Diversity Tx path
DIV-RX—Diversity Rx path
BPF3—Bandpass filter
BPF4—Bandpass filter
DIV-RX2—Second diversity Rx path

What is claimed is:

1. A circuit assembly, comprising:
an antenna path, which is configured to be connected to a first antenna;
a transmission path;
a reception path;
a first duplexer, operating with acoustic waves, which connects the transmission and reception paths in each case to the antenna path;
a node in the antenna path, wherein the node is connected to a further signal path in which a band pass filter is connected to ground in series via an impedance, and
wherein the circuit assembly is configured to suppress an interference signal; and
a second antenna path, which is configured to be connected to a second antenna, a second transmission path, a second reception path and a second duplexer operating with acoustic waves, which connects the second transmission and the second reception paths to the second antenna path,
wherein the first antenna path is configured to be used for transmitting and receiving signals in a first frequency band and the second antenna path is configured to be used for transmitting and receiving signals in a second frequency band,
wherein the first antenna path is connected to a first diversity path configured for receiving signals in the second frequency band,
wherein the first diversity path is connected to a third duplexer, which connects the first diversity path to a diversity RX path and a diversity TX path, and
wherein the diversity TX path is connected to ground via an impedance such that the diversity TX path is configured to be used for dissipating an interference signal.

2. The circuit assembly according to claim 1, wherein a band-stop filter is arranged in the antenna path.

3. The circuit assembly according to claim 1 or 2, wherein a first phase shifter is interconnected between the antenna path and the transmission path.

4. The circuit assembly according to claim 3, wherein a second phase shifter is interconnected between the antenna path and the reception path.

5. The circuit assembly according to claim 1, wherein the second antenna path is connected to a second diversity path.

6. The circuit assembly according to claim 5, wherein the second diversity path is connected to a fourth duplexer, which connects the second diversity path to a second diversity Rx path and second a diversity Tx path, and
wherein the second diversity Tx path is connected to ground via an impedance.

7. A module into which a circuit assembly according to claim 1 is integrated.

8. A device for wireless communication comprising a module according to claim 7.

* * * * *